(12) United States Patent
Umeda

(10) Patent No.: US 9,130,374 B2
(45) Date of Patent: Sep. 8, 2015

(54) LOAD CONTROL DEVICE, IMAGE FORMING APPARATUS, AND METHOD OF CONTROLLING LOAD

(71) Applicant: Seiko Epson Corporation, Tokyo (JP)

(72) Inventor: Atsushi Umeda, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 52 days.

(21) Appl. No.: 13/796,347

(22) Filed: Mar. 12, 2013

(65) Prior Publication Data

US 2013/0235098 A1 Sep. 12, 2013

(30) Foreign Application Priority Data

Mar. 12, 2012 (JP) .................. 2012-054793

(51) Int. Cl.
*H05B 1/02* (2006.01)
*H02J 3/00* (2006.01)
*B41J 29/38* (2006.01)
*B41J 29/393* (2006.01)
*G03G 15/11* (2006.01)

(52) U.S. Cl.
CPC .. *H02J 3/00* (2013.01); *B41J 29/38* (2013.01); *B41J 29/393* (2013.01); *G03G 15/11* (2013.01); *Y10T 307/766* (2015.04)

(58) Field of Classification Search
CPC ............ H02J 3/00; B41J 29/38; B41J 29/393; G03G 15/11; H05B 3/066; H05B 3/0236; H05B 3/0028; H05B 3/06

USPC ................. 219/493, 216, 497, 501, 483–487; 323/235, 319, 901; 355/69
See application file for complete search history.

(56) References Cited

U.S. PATENT DOCUMENTS

| 4,506,144 | A | * | 3/1985 | Hesford et al. ................ 219/497 |
| 4,816,982 | A | * | 3/1989 | Severinsky ..................... 363/44 |
| 5,079,410 | A | * | 1/1992 | Payne et al. .................... 219/506 |
| 7,193,180 | B2 | * | 3/2007 | Cook et al. ..................... 219/216 |
| 8,803,048 | B2 | * | 8/2014 | Bassill et al. .................. 219/647 |
| 2013/0334201 | A1 | * | 12/2013 | Nicholson ...................... 219/492 |

FOREIGN PATENT DOCUMENTS

JP 2002-084736 A 3/2002

* cited by examiner

*Primary Examiner* — Mark Paschall
(74) *Attorney, Agent, or Firm* — Nutter McClennen & Fish LLP; John J. Penny, Jr.

(57) ABSTRACT

A switch control unit detects a power supply voltage of a heater detected by a voltage detection unit, and switch is performed on a load state of the heater in a range from a first load state to a fourth load state when the detected power supply voltage falls into a predetermined first domain. On the other hand, the switch is performed on the load state that ranges from the first load state to the third load state when the detected power supply voltage falls into a predetermined second domain that is higher in voltage than the first domain. That is, when the power supply voltage is in the second domain that is higher in voltage than the first domain, a limitation is imposed on the switch to the fourth load state where a combined resistance value is the lowest among the first and fourth load states.

17 Claims, 8 Drawing Sheets

LOAD CONTROL DEVICE, IMAGE FORMING APPARATUS, AND METHOD OF CONTROLLING LOAD

BACKGROUND

1. Technical Field

The present invention relates to a load control device, an image forming apparatus, and a method of controlling a load.

2. Related Art

In the related art, a load control device is known which performs, for example, switch that turns on and off a load, such as a heater used in an image forming apparatus. For example, it is disclosed in JP-A-2002-84736 that in a heater operating on electricity from an AC power supply in a power control apparatus, temperature control is performed on the heater by intermittent control that uses a zero cross control period during which the load turns on and an idle period during which the load turns off, between the zero cross points in a power supply wave pattern. In this manner, the load is controlled by performing the switch that turns the heater on and off using the zero cross point of the AC power supply, and for example inrush electric current at the time of turning on the heater may be suppressed, in comparison to control of the load by phase control that changes a phase that turns on the heater.

Incidentally, in a case where the control by the switch that turns on and off one load is performed as disclosed in JP-A-2002-84736, when the power supply voltage fluctuates, electric currents at the time of turning on the load differ. For example, when the load turns on in a case where the power supply voltage is high, a large electric current flows, compared to a case where the power supply voltage is low. Accordingly, there occurs a problem in that a voltage drop in the power supply voltage is increased and the large electric current flows.

SUMMARY

An advantage of some aspects of the invention is to control a load more appropriately in terms of a relationship with a power supply voltage.

The invention adopted following means.

According to an aspect of the invention, there is provided a load control device that controls a load which is switchable to any one of n stage load states including a first load state, a second load state and so forth to an n-th load state of which resistance values are R1, R2, and so forth to Rn (n is an integer that is equal to or greater than 3 and R1>R2> . . . >Rn), respectively, including a detection unit that detects a value relating to a power supply voltage of the load, and a switch control unit that performs switch on the load state in a range from the first load state to the n-th load state when the power supply voltage derived based on the detected value falls into a predetermined first domain, and that performs the switch on the load state in a range from the first load state to the (n−k)-th load state (1≤k<n and k is an integer) when the power supply voltage derived based on the detected value falls into a predetermined second domain that is higher in voltage than the first domain.

In the load control device, the load, a control-targeted object may be switched to either of the n load states of the first load state, the second load state, and so forth to the n-th load state of which the resistance values are R1, R2, and so forth to Rn, respectively. Then, a value relating to the power supply voltage of the load is detected, and when the power supply voltage derived based on the detected value falls into a predetermined first domain, the switch is performed in a range from the first load state to the n-th load state. On the other hand, when the power supply voltage derived based on the detected value falls into a predetermined second domain that is higher in voltage than the first domain, the switch is performed in the range from the first load state to the (n−k)-th load state. That is, with regard to the load that is switchable to three or more load states that are different in the resistance value, when the power supply voltage falls into the second domain that is higher in voltage than the first domain, a limitation is imposed on the switch to the load state that ranges from the (n−k+1)-th load state including the n-th load state where the resistance value is the lowest among the first to n-th load states, to the n-th load state. Accordingly, in a case where the power supply voltage is comparatively high, a maximum value of electric current flowing through the load is suppressed by suppressing a decrease in the resistance value that is obtainable by the load. When this is done, for example, a voltage drop increase in the power supply voltage and flowing of the large electric current may be suppressed. That is, the load may be more appropriately controlled using a relationship with the power supply voltage. At this point, "the value relating to the power supply voltage of the load," for example, may be the power supply voltage itself, and may be the voltage after the power supply voltage is voltage-transformed at a predetermined rate, and may be electric current flowing through the load. In a case where the electric current flowing through the load is detected as the value relating to the power supply voltage, the power supply voltage may be derived from the resistance value of the load and the detected electric current. Furthermore, in addition to the first domain and the second domain, one or more domains may be present, such as a third domain. For example, the third domain is defined as a domain that is higher in voltage than the second domain, and the switch control unit may perform the switch that ranges from the first load state to the (n−k2)-th load state (1≤k<k2<n, and k2 is an integer) when the power supply voltage falls into the third domain. That is, when the power supply voltage falls into the third domain, a decrease in the resistance value that is obtainable by the load may be more suppressed, compared to a case where the power supply voltage is included in the second domain.

In the load control device according to the aspect of the invention, the switch control unit may switch the load state by one stage. When this is done, for example, fluctuation in the resistance value of the load, that is, fluctuation in electric current may be suppressed, compared to a case where the load state is switched by two stages, such as a case where the first load state is switched directly to the third load state. The greater a change rate of electric current, the greater the change rate of the power supply voltage, and although a problem occurs such as an occurrence of a flicker in other devices in some cases, the occurrence of such a problem may be suppressed by switching the load state by one stage. That is, the performance of different types of control in the first domain and in the second domain, described above, may suppress not only a maximum value (=a maximum value of a voltage drop in the power supply voltage) of electric current flowing through the load, but also minimize the change rate of electric current flowing through the load (=the change rate of the power supply voltage). Because of this, the load may be controlled more appropriately using the relationship with the power supply voltage.

In the load control device according to the aspect of the invention, the switch control unit may not be a unit that does not perform the next switch until a predetermined condition for approving the switch is met after the load state is changed.

When this is done, the frequent switch to the load state may be suppressed and the fluctuation in the electric current flowing through the load, that is, the fluctuation in the power supply voltage may be more suppressed. Additionally, the predetermined condition for approving the switch may be met when a predetermined time elapses after the load state is switched. Furthermore, in a case where the load is the heater, the predetermined condition for approving the switch may be met when a temperature of the heater or a temperature of an object heated by the heater is changed to a predetermined temperature or more after the load state is switched.

In the load control device according to the aspect of the invention, the load may support a predetermined first voltage V1 and a predetermined second voltage V2 (>V1) as a rated voltage of a commercial power supply, the first domain may be a domain that includes the first voltage V1 and the second domain may be a domain that includes the second voltage V2. When this is done, the flowing of the large electric current may be suppressed when the load is operated with the commercial power supply of which the rated voltage is high. That is, the load may be controlled more appropriately depending on whether the rated voltage of the commercial power supply is high or low.

For example, the first domain and the second domain in the load control device according to the aspect of the invention may be ranges that are determined in advance in such a manner that the power supply voltage falls into either of the first domain and the second domain depending on the voltage fluctuation in the power supply voltage of the load. Accordingly, the flowing of the large electric current may be suppressed when the voltage fluctuation causes the power supply voltage to be a high voltage. That is, the load may be controlled more appropriately depending on whether the power supply voltage is caused to be high or low.

In the load control device according to the aspect of the invention, the switch control unit may select either of multiple switch patterns including the switch pattern, made from a combination of at least two or more of the load states among the multiple load states, in which a switch order is determined in such a manner that the load state is switched by one stage, and may perform the switch on the load state according to the selected switch pattern. At this point, the switch pattern is a pattern that indicates at what timing and in what order the load states is switched. The multiple switch patterns may be prepared, for example, as a pattern for the switch timing and the switch order in such a manner that a flicker is able to be suppressed in advance and the fluctuation in the power supply voltage may be suppressed more appropriately by selecting either of the switch patterns. Additionally, at least one switch pattern of the multiple switch patterns may be "a switch pattern, made from a combination of at least two or more of the load states, in which the switch order is determined in such a manner that the load state is switched by one stage." For example, a switch pattern that is not a combination of two or more load states, such as a pattern in which a certain single load state continues, may be included in the multiple switch patterns.

In the load control device according to the aspect of the invention, the load may be a heater, and the switch control unit may be a unit that performs feed control which selects either of the multiple switch patterns every predetermined period and performs the switch on the load state according to the selected switch pattern in such a manner that a temperature of the load or a temperature of an object heated by the load approaches a target value.

In the load control device according to the aspect of the invention, the load may be constructed from a plurality of load elements, the switch of the load state may be made possible by performing at least either of the switch that turns on and off each load element and the switch between an in-series connection state and an in-parallel connection state with respect to the plurality of load elements, and the resistance value of the load may be a combined resistance value of the plurality of load elements. When this is done, the load state may be switched with comparative ease, by the switch that turns on and off the load element, or by the switch of a connection state.

In the load control device according to the aspect of the invention, the power supply voltage of the load may be an AC voltage. The load control device may include a zero cross detection unit that detects a zero cross point of the AC voltage. The switch control unit may perform the switch on the load state with the zero cross point. When this is done, an occurrence of inrush electric current at the time of the switch of the load state may be more suppressed.

According to another aspect of the invention, there is provided an image forming apparatus including, a load control device according to any of the aspects described above, according to the aspect of the invention, a head through which liquid is discharged to form an image on a medium, and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2> . . . >Rn).

Since the image forming apparatus according to the aspect of the invention includes the load control device, described above, according to the aspect of the invention, the same effect as in the load control device, described above, according to the aspect of the invention, may be obtained. That is, the effect that the load is controlled more appropriately, using a relationship with the power supply voltage may be obtained, such as the effect that a maximum value of the electric current flowing through the load is suppressed by suppressing a decrease in the resistance value of the electric current obtained by the load in a case where the power supply voltage is comparatively high.

According to still another of the invention, there is provided a method of controlling a load that is switchable to any one of n stage load states including a first load state, a second load state and so forth to an n-th load state of which resistance values are R1, R2, and so forth to Rn (n is an integer that is equal to or greater than 3 and R1>R2> . . . >Rn), including, (a) detecting a value relating to a power supply voltage of the load, and (b) performing switch on the load state in a range from the first load state to the n-th load state when the power supply voltage derived based on the detected value falls into a predetermined first domain and performing the switch on the load state in a range from the first load state to the (n−k)-th load state ($1 \leq k < n$ and k is an integer) when the power supply voltage derived based on the detected value falls into a predetermined second domain that is higher in voltage than the first domain.

In the method of controlling the load according to the aspect of the invention, when the power supply voltage falls into the second domain that is higher in voltage than the first domain, a limitation may be imposed on the switch to the load state that ranges from the (n−k+1)-th load state including the n-th load state where the resistance value is the lowest among the first to n-th load states, to the n-th load state. Accordingly, in a case where the power supply voltage is comparatively high, a maximum value of electric current flowing through the load may be suppressed by suppressing a decrease in the resistance value that is obtainable by the load. That is, the load may be controlled more appropriately using a relationship with the power supply voltage. Additionally, in the method of controlling the load according to the aspect of the invention, the various aspects of the load control apparatus, described above, according to the aspect of the invention, may be employed, and a step may be added which realizes each function of the load control device, described above, according to the aspect of the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
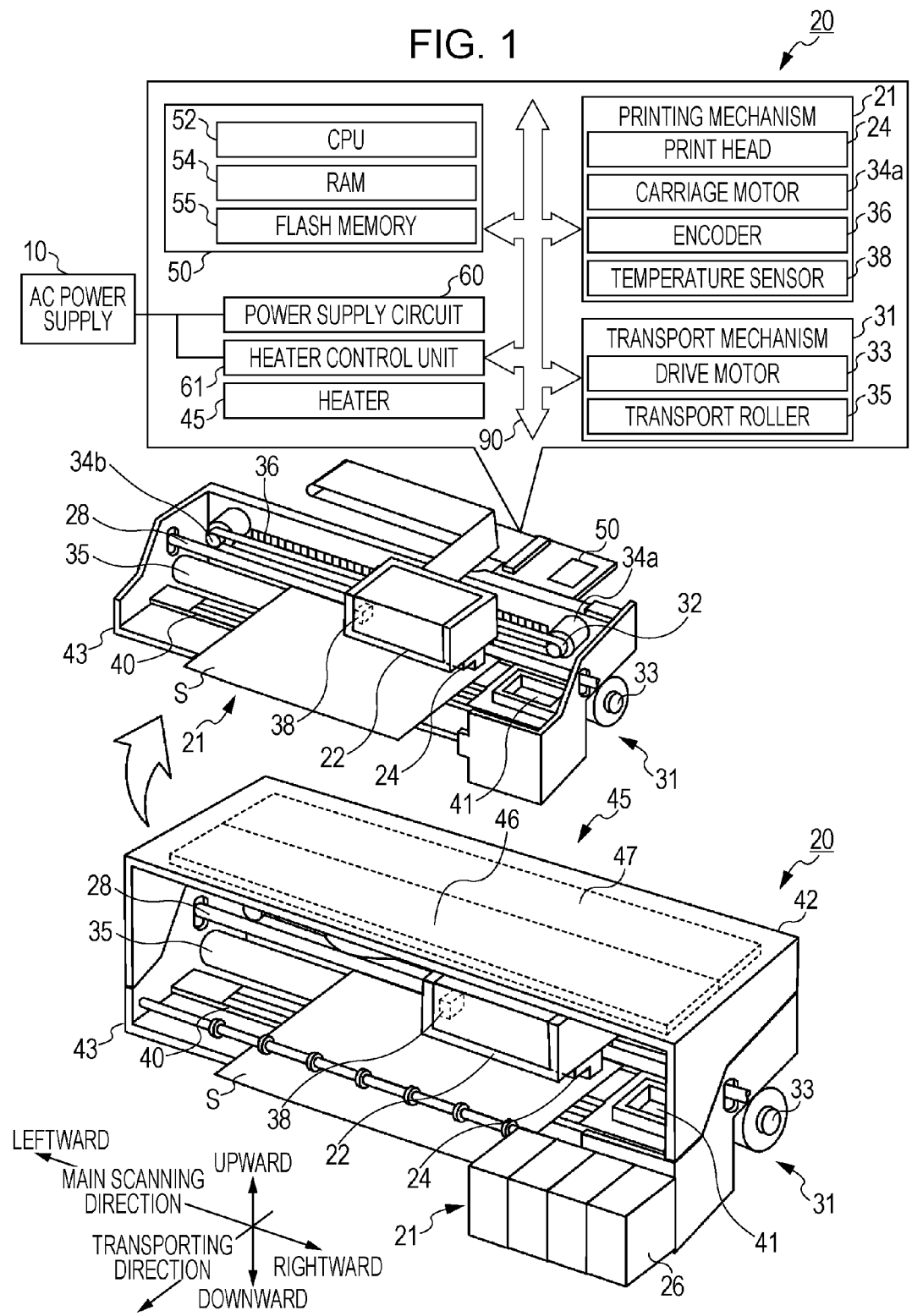
FIG. 1 is a configuration diagram illustrating an outline of a configuration of a printer according to one embodiment of the invention.
Figure 2:
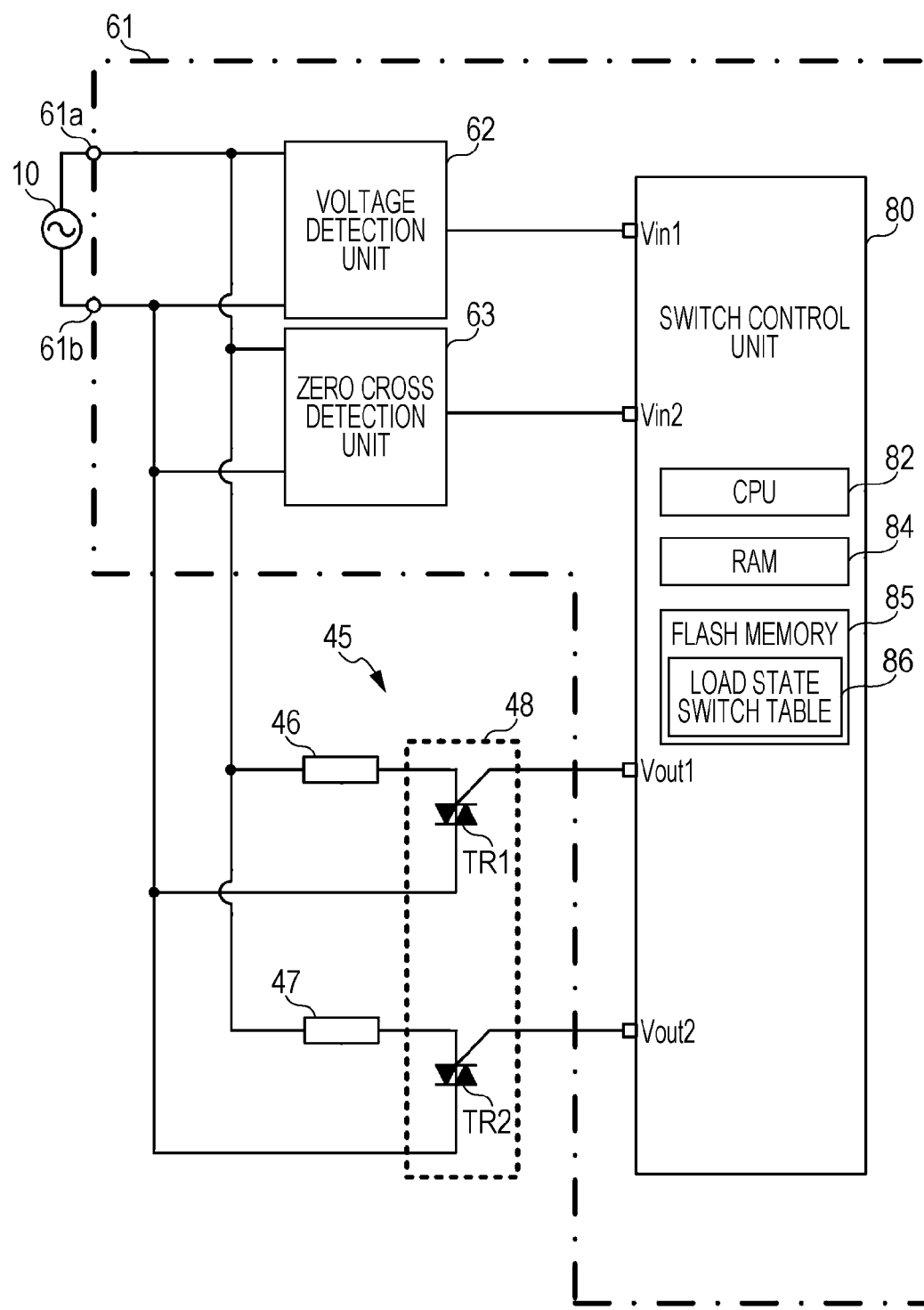
FIG. 2 is a circuit diagram illustrating a heater control unit.

Next, an embodiment according to the aspect of the invention is described referring to the drawings. FIG. 1 is a configuration diagram illustrating an outline of a configuration of a printer 20 according to one embodiment of the invention. FIG. 2 is a circuit diagram illustrating a heater control unit 61. FIG. 1 also illustrates a configuration in which a cover 42 and a heater 45 are excluded. The printer 20 according to the present embodiment is configured as an ink jet type printer. As illustrated in FIG. 1, the printer 20 includes a print mechanism 21 that performs printing by ejecting an ink as a fluid from a print head 24 onto a print medium S (for example, a record paper sheet) that is transported to over a platen 40, and a transport mechanism 31 that transports the print medium S from a transport direction upper stream (inward from the drawing) to a transport direction lower stream (outward from the drawing) in such a manner that a drive motor 33 driving a transport roller 35 causes the print medium S to pass over the platen 40. Furthermore, the printer 20 includes a capping device 41 that seals the print head 24 that is formed to the end of the platen 40, positioned on the middle right side of the drawing, the heater 45 that heats the print medium S attached to the reverse side of the cover 42 covering the print mechanism 21, a controller 50 that controls the entire printer 20, a power supply circuit 60 that supplies electricity to each component of the printer 20 connected to an AC power supply 10 (for example, a commercial power supply), a heater controller 61 that controls the heater 45 connected to the AC power supply 10. The print mechanism 21, the transport mechanism 31, the controller 50, and the heater control unit 61 are connected to one another via a bus 90 in such a manner as to exchange information between them. The printer 20 is configured as an image forming apparatus that forms an image by performing printing on the print medium S using the ink that the heater 45 dries by heating. Furthermore, the printer 20 supports two types of power supply voltages from the commercial power supplies as the AC power supply 10. A rated voltage from the one commercial power supply is a first voltage V1 and the rated voltage from the other commercial supply is a second voltage V2 (>V1). According to the present embodiment, the first voltage V1 is AC 100 V, and the second voltage V2 is AC 200 V.

The printing mechanism 21 includes a carriage 22 that is moved backward and forward in the main scanning direction (leftward and rightward) along a guide 28 by a carriage belt 32 driven by a carriage motor 34a, the print head 24 that forms the image by discharging an ink droplet onto the print medium S passing over the platen 40, and an ink cartridge 26 that supplies the ink to the print head 24 individually accommodating an ink of each color. The carriage 22 is moved in the main scanning direction intersecting the transporting direction of the print medium S, by the carriage motor 34a that is arranged to the right side of a mechanical frame 43, a driven roller 34b that is arranged to the left side of the mechanical frame 43, and the carriage belt 32 that is mounted on the carriage motor 34a and the driven roller 34b. An encoder 36, which detects a position of the carriage 22, is arranged on the back side of the carriage 22, and a position of the carriage 22 may be managed using the encoder 36.

The print head 24 is provided on the bottom of the carriage 22, and each color ink is discharged from a nozzle provided on a lower surface of the print head 24, using a technique in which deformation of a piezoelectric element resulting from applying a voltage to the piezoelectric element applies a pressure to the ink. Moreover, the print head 24 may employ a technique in which bubbles occurring when applying a voltage to a heat-resistant element and heating the ink apply a pressure to the ink. The ink cartridge 26 is installed on the side of the mechanical frame 43, and individually accommodates color inks of which the colors are yellow (Y), magenta (M), cyan (C), and black (K). Each of yellow (Y), magenta (M) and cyan (C) is a solution of a dye or a pigment as a coloring agent in a water solvent.

A temperature sensor 38 that measures a temperature of a printing space above the platen 40 is provided in the print head 24. The temperature sensor 38 is configured as a non-contract pyroelectric infrared sensor that measures a temperature of an object by converting a temperature change due to an infrared ray entering in the vertical direction (directly downward), into an electric signal. The temperature sensor 38 may measure a temperature of the print medium S on the platen 40, as the temperature of the object heated by the heater 45. The temperature sensor 38 may measure a temperature of one or more spots including the heated print medium S, along with movement of the print head 24.

The platen 40 is a member that supports the print media S heated by the heater 45 that is transported to under the head 24, and is formed along the main scanning direction of the print head 24 in such a manner as to face toward the print head 24 moving along the guide 28.

The heater 45 is a heater as a load that is positioned over the carriage 22 and the platen 40. The heater 45 includes a first heater element 46 as a load element arranged to the downstream side of the transporting direction, a second heater element 47 as the load element arranged to the upstream side of the transporting direction, and a switch unit 48 (refer to FIG. 2) that switches on (flow of electric current) and switches off (non-flow of electric current) the first heater element 46 and the second heater element 47. The heater 45 supports two types of power supply voltages from the AC power supply 10 described above, a first voltage V1 and a second voltage V2. The first heater element 46 and the second heater element 47 are heater elements that generate heat in a resistance heating manner. Accordingly, the heater 45 may dry up the ink discharged onto the print medium S by heating the print medium S passing over the platen 40. The heater 45 is longer in the main scanning direction than the print medium S, and may heat the entire print medium S in an approximately uniform manner over the main scanning direction. The first heater element 46 and the second heater element 47 of the heater 45 are connected to the AC power supply 10 in parallel, and operates (generates heat) by the flow of electric current from the AC power supply 10. According to the present embodiment, resistance values of the first heater element 46 and the second heater element 47 are defined as Ra and Rb (<Ra), respectively. Resistance values Ra and Rb are, for example, several tens of ohms.

The switch unit 48 includes a triac TR1 that switches on and off the first heater element 46, and a triac TR2 that switches on and off the second heater element 47. Terminals T1 and T2 of the triac TR1 connect in series to the first heater element 46 and a terminal G (gate) of the triac TR1 connects to a terminal Vout1 of a switch control unit 80 of the heater control unit 61. In a state where electric current (trigger electric current) is not input from the terminal Vout1 of the switch control unit 80, the triac TR1 turns off and thus electric current does not flow between the terminals T1 and T2, thereby turning the first heater element 46 off. On the other hand, when electric current is input from the terminal Vout1, the triac TR1 turns on, and thus the electric current flows between the terminals T1 and T2, thereby turning on the first heater element 46. Furthermore, when electric current is not input from the terminal Vout1 and a voltage from the AC power supply 10 becomes at a zero cross point after the triac TR1 has turned on (when a value of electric current flowing through the first heater element 46 becomes zero), the triac TR1 returns back to an ON state. Terminals T1 and T2 of the triac TR2 connect in series to the second heater element 47 and a terminal G (gate) of the triac TR2 connects to the terminal Vout2 of the switch control unit 80 of the heater control unit 61. Like the triac TR1, in a state where electric current (trigger electric current) is not input from a terminal Vout2 of the switch control unit 80, the triac TR2 turns off and thus turns the second heater element 47 off. When electric current is input from the terminal Vout2, the triac TR2 turns on and thus turns on the second heater element 47. Furthermore, when electric current is not input from the terminal Vout2 and a voltage from the AC power supply 10 becomes at a zero cross point after the triac TR2 has turned on (when a value of electric current flowing through the second heater element 47 becomes zero), the triac TR2 returns back to an OFF state.

In this manner, the heater 45 may individually switch on and off the first heater element 46 and the second heater element 47 by turning on and off the triac TR1 and the triac TR2. Accordingly, the heater 45 may switch between load states that are categorized into four stages, a first load state where both of the first heater element 46 and the second heater element 47 turn off and electric current does not flow through the first heater element 46 and the second heater element 47, that is, a combined resistance value R of the heater 45 is infinite, a second load state where the first heater element 46 turns on and the second heater element 47 turns off and the combined resistance value R is equal to Ra, a third load state where the first heater element 46 turns off and the second heater element 47 turns on and the combined resistance value R is equal to Rb, and a fourth load state where both of the first heater element 46 and the second heater element 47 turn on and the combined resistance value R is equal to Ra×Rb/(Ra+Rb). Additionally, when the combined resistance values of the heater 45 are defined as R1 to R4, in the first to fourth load states, respectively, the relationship is expressed as R1 (=infinity)>R2 (=Ra)>R3 (=Rb)>R4 (=Ra×Rb/(Ra+Rb)). For this reason, when other conditions are the same, such as a voltage applied to the heater 45, power consumption (an amount of produced heat) becomes great in the heater 45, in the following sequence: the first load state, the second load state, the third load state, the fourth load state.

The power supply circuit 60 connects to the AC power supply 10, and is a circuit that supplies each unit of the printer 20 with electric power supplied from the AC power supply 10. The power supply circuit 60 converts AC power supplied from the AC power supply 10 into direct current power using an AC-DC conversion circuit not illustrated, and supplies the result to each unit of the printer 20, such as the printer mechanism 21, the transport mechanism 31, the controller 50, and the heater control unit 61. Additionally, the power supply circuit 60 may supply multiple DC voltages, such as DC 20 V and DC 5 V according to an operating voltage of a supply destination.

The heater control unit 61 connects to the AC power supply 10 and the heater 45, and controls the heater 45 by switching on and off the first heater element 46 and the second heater element 47 of the heater 45. As illustrated in FIG. 2, the heater control unit 61 includes a pair of input terminals 61a and 61b that connect to the AC power supply 10, a voltage detection unit 62 that detects a power supply voltage V from the AC power supply 10, a zero cross detection unit 63 that detects a zero cross point of the power supply voltage V, and the switch control unit 80 that causes the heater 45 to switch between the load states.

The voltage detection unit 62 detects the power supply voltage V that is input from the AC power supply 10 via the input terminals 61a and 61b. The voltage detection unit 62 A/D converts a power supply voltage V, input from the AC power supply 10, and outputs the result to the terminal Vin1 of the switch control unit 80.

The zero cross detection unit 63 detects a zero cross point of a waveform of the voltage that is input from the AC power supply 10 via the input terminals 61a and 61b. The zero cross detection unit 63 includes a full wave rectification circuit, not illustrated, and a photo coupler made from a light emitting diode and a phototransistor. The zero cross detection unit 63 makes the light emitting diode emit light using a voltage that results from making a full wave rectification of a voltage from the AC power supply 10, and detects as the zero cross point a point in time when the light emitting diode stops emitting light, and thus the phototransistor turns off. Then, the zero cross detection unit 63 outputs a different signal to the switch control unit 80 depending on whether or not the zero cross point occurs, such as making a terminal Vin2 be in a HIGH state when the zero cross point is detected.

Figure 3:
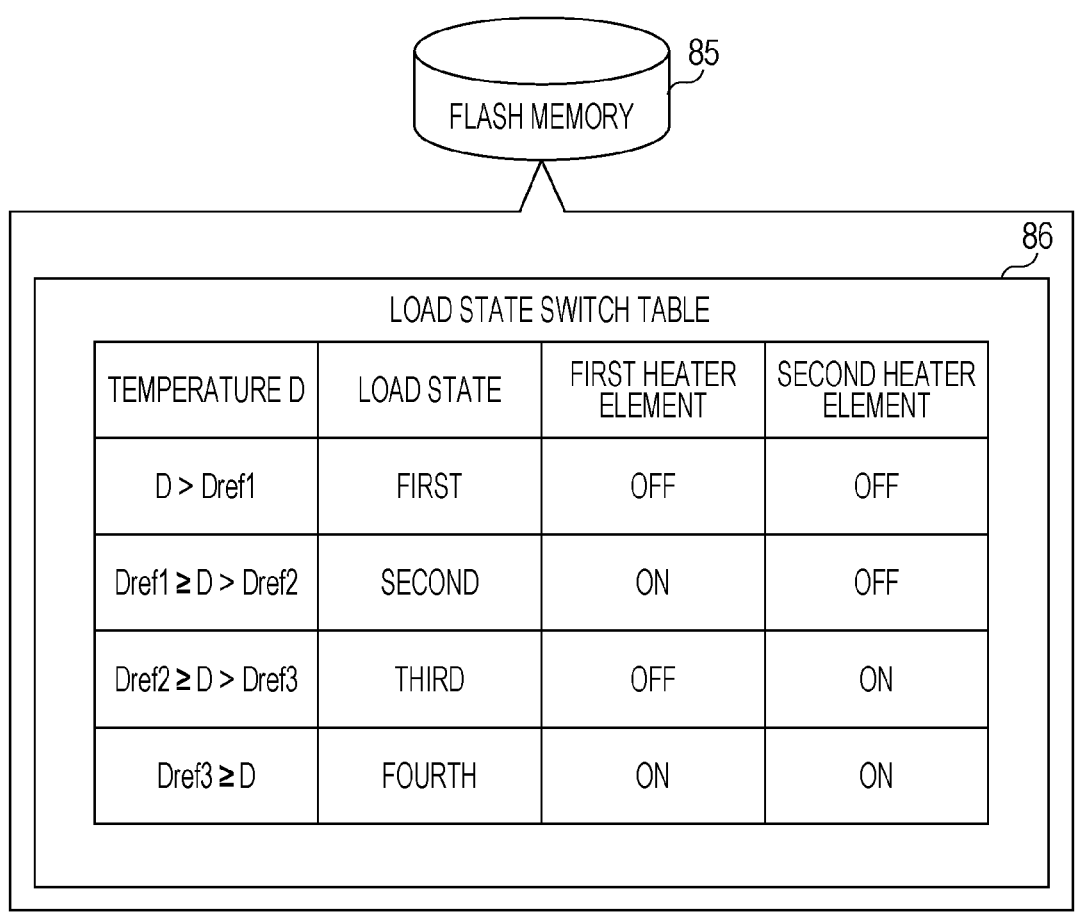
FIG. 3 is a view illustrating a load state switch table.

The switch control unit 80 is configured as a microcomputer (Micom) with the CPU 82 playing a leading role. The switch control unit 80 includes a RAM 84 that temporarily stores or saves data, a flash memory 85 that is able to store, for example, a program for a switch control routine described below and rewrite data, the terminal Vin1 that connects to the voltage detection unit 62, the terminal Vin2 that connects to the zero cross detection unit 63, the terminal Vout1 that connects to the terminal G of triac TR1 of the switch unit 48, and the terminal Vout2 that connects to the terminal G of the triac TR2 of the switch unit 48. For example, an input/output port, not illustrated, connects to the controller 50. Through the input/output port, information exchange is performed between the controller 50 and the temperature sensor 38 of the print mechanism 21 via a bus 90. A load state switch table 86, in which the load state of the heater 45 is matched to a temperature D of the print medium S measured by the temperature sensor 38, is stored in the flash memory 85. FIG. 3 is a view illustrating the load state switch table 86. As illustrated, in the load state switch table 86, the temperature D of the print medium S, the first to fourth load states of the heater 45, and ON and OFF states of the first heater element 46 and the second heater element 47 in each load state are matched to one another. More specifically, using temperature threshold values Dref1 to Dref3 of the temperature D, the first load state is matched to a state where the temperature D exceeds the temperature threshold value Dref1, the second load state is matched to a state where the temperature D is equal to or less than the temperature threshold value Dref1 and exceeds the temperature threshold value Dref2, the third load state is matched to a state where the temperature D is equal to or less than the temperature threshold value Dref2 and exceeds the temperature threshold value Dref3, and the fourth load state is matched to a state where the temperature D is equal to or less than the temperature threshold value Dref3. That is, as the temperature D is in the lower state, the load state where the amount of produced heat in the heater 45 is greater is matched. The temperature threshold values Dref1 to Dref3 correspond to target temperatures (for example, 50° C.) of the print medium S, respectively, and may be determined based on a relationship between the target temperature and the amount of produced heat in each load state of the heater 45, for example, by experiment. For example, the temperature threshold value Dref1 may be a value that exceeds the target temperature, and the target temperatures Dref2 and Dref3 may be values that are less than the target temperature. The switch control unit 80 has a function of performing control to input the power supply voltage V detected by the voltage detection unit 62, from the terminal Vin1, and input the temperature D of the print medium S detected by the temperature sensor 38, from the input/output port, not illustrated. Furthermore, the switch control unit 80 has a function of performing control to output a signal from the terminals Vout1 and Vout2 and switch the load state of the heater 45 to either of the first to fourth load states, based on these values that are input. Furthermore, the switch control unit 80 has a function of performing switching by one stage at a time of switching the load state and of not performing the next switching until a predetermined switch approval condition is met after the load state has been switched.

The controller 50 is configured as s microprocessor with the CPU 52 playing a leading role. The controller 50 includes a RAM 54 that temporarily stores or saves data, and a flash memory 55 that is able to store various processing programs and rewrite data. An interface (I/F) not illustrated, and the input/output port not illustrated connects to the controller 50. Through the interface (I/F), the information exchange with an external apparatus such as a personal computer is performed, and through the input/output port, data input and output is performed. For example, the controller 50 receives input of a position signal from the encoder 36, and input of a signal from the temperature sensor 38 via an input port. Furthermore, for example, the controller 50 outputs a drive signal to the print head 24, outputs a drive signal to the drive motor 33 and the carriage motor 34a, and outputs a heater control starting signal and a heater control ending signal to the switch control unit 80 of the heater control unit 61 via an output port.

Next, operation of the printer 20 with this configuration according to the present embodiment is described. When a user instructs the printer 20 to print an image out on the print medium S, for example, via the personal computer that connects to the printer 20, the controller 50 inputs image data on a print-targeted object from the personal computer, stores the image data in a print buffer region of the RAM 54, and executes print processing routine by which an image is formed on the print medium S based on the image data. In the print processing routine, the controller 50 repeats processing that controls the drive motor 33 and thus transports the print medium S, and processing that discharges ink through a nozzle of the print head 24 to perform printing on data for one bus among the image data while controlling the carriage motor 34a to move the carriage 22, in order to print the image out on the print medium S. Furthermore, the controller 50 outputs the heater control starting signal to the switch control unit 80 at the time of starting the print processing routine, and outputs the heater control ending signal to the switch control unit 80 when the printing is ended. The switch control unit 80 repeatedly executes the heater switch control routine during the period of the time from when the controller 50 inputs the heater control starting signal to when the controller 50 inputs the heater control ending signal. The heater switch control routine is described below.

Figure 4:
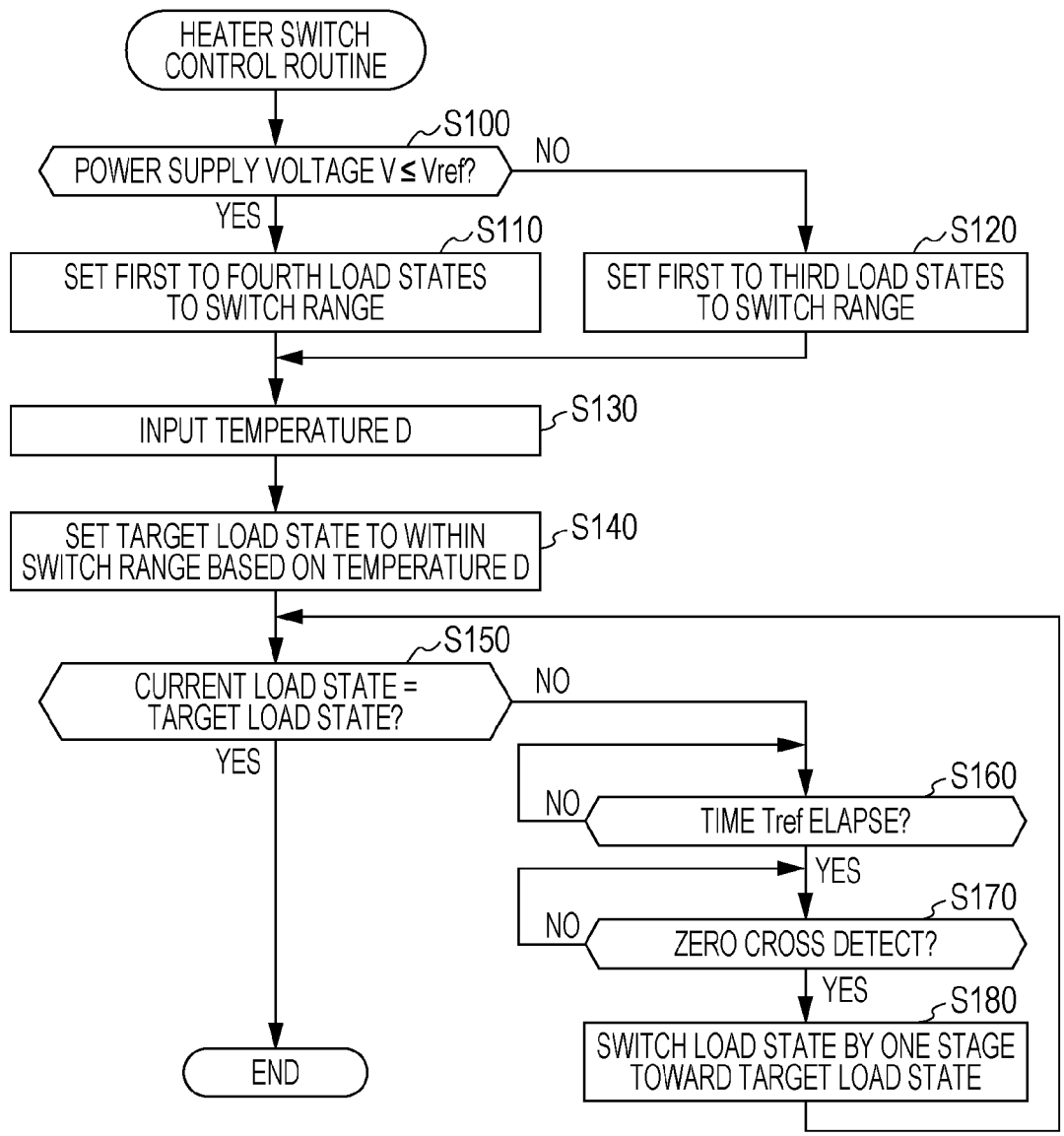
FIG. 4 is a flow chart illustrating one example of a heater switch control routine.

FIG. 4 is a flow chart illustrating one example of the heater switch control routine. When the routine is executed, the CPU 82 of the switch control unit 80 first determined whether or not a value of the power supply voltage V detected by the voltage detection unit 62 is equal to or less than a predetermined voltage threshold value Vref (Step S100). When a domain of values that are equal to or less than the voltage threshold value Vref is defined as a first domain, and a domain of values that exceed the voltage threshold value Vref is defined as a second domain, this processing is equivalent to processing that determines whether the power supply voltage V falls into either of the first domain and the second domain. Furthermore, according to the present embodiment, the voltage threshold value Vref is defined as 150 V, and the first domain is set to include a first voltage V1 (=AC 100 V) and the second domain is set to include a second voltage V2 (=AC 200 V). Then, in Step S100, when the power supply voltage V is equal to or less than a voltage threshold value Vref1, that is, when the power supply voltage V falls into the first domain, the first to fourth load states are set as a switch domain (Step S110). On the other hand, in Step S100, when the power supply voltage V exceeds the voltage threshold value Vref1, that is, when the power supply voltage V falls into the second domain, the first to third load states are set as the switch domain. That is, when the power supply voltage V falls into the second domain that is higher in voltage than the first domain, a limitation is imposed on switch to the fourth load state where the combined resistance value R is the lowest among the first to fourth load states, and thus flowing of a large electric current that results from the switch to the fourth load state may be suppressed.

In Step S110 or Step S120, when the switch domain is set, the CPU 82 inputs the temperature D of the print medium S from the temperature sensor 38 (Step S130), and sets the target load state of the heater 45 to be within the switch domain, based on the temperature D (Step S140). This processing is performed using the load state switch table 86. More specifically, when the switch domain that is set is among the first to fourth load states and the switch to either of the load states is not limited, the load state that corresponds to the temperature D in the load state switch table 86 is read from the flash memory 85, and the load state, as is read, is set as the target load state. On the other hand, when the switch domain that is set is among the first and third load states, the load state that corresponds to the temperature D in the load state switch table 86 is read from the flash memory 85, and when the read load state is the load state that is out of the switch domain, the load state where the combined resistance value R is the lowest in the switch domain is set as the target load state. For example, when temperature D is equal to or less than a temperature threshold value Dref3, the corresponding load state in the load state switch table 86 is the fourth load state as illustrated in FIG. 3. At this point, when the switch domain that is set is among the first and fourth load states, the fourth load state, as it is, is set as the target load state. On the other hand, when the switch domain that is set is among the first to third load states, since the fourth load state is out of the switch domain, the third load state where the combined resistance value R is the lowest in the switch domain is set as the target load state.

In Step S140, when the target load state is set, the CPU 82 determines whether or not the current load state is matched to the target load state (Step S150).

Additionally, the current load state is determined based on whether or not electric current flows from terminals Vout1 and Vout2 of the switch control unit 80. Furthermore, when the heater switch control routine initially starts, this is defined as a state where electric current does not flow through either of the terminals Vout1 and Vout2, that is, the first state. Then, when the current load state is different from the target load state, there is a wait until a predetermined time Tref elapses from when the last switch is made to the load state (Step S160), and thereafter there is a wait until the zero cross detection unit 63 detects the zero cross point of the AC power supply 10 (Step S170), and when the zero cross point is detected, the load state is switched by one stage toward the target load state (Step S180). For example, when the target load state is the fourth load state, and the current load state is the first load state, the switch by one stage leads to the second load state. Similarly, when the target load state is the second load state, and the current load state is the fourth load state, the switch by one stage leads to the third load state. Additionally, determination of whether or not the time Tref elapses is performed based on count by a timer, not illustrated, of the switch control unit 80, and the count by the timer is defined as reset when the heater switch control routine is initially performed and when Step S180 is executed. Then, when the processing in Step S180, is performed, the processing in Step S150, and the processing in Steps that follow are performed. Accordingly, the switch is performed on the load state by one stage until the current load state is matched to the target load state. Then, when the current load state is matched to the target load state in Step S150, the present routine is ended.

Figure 5:
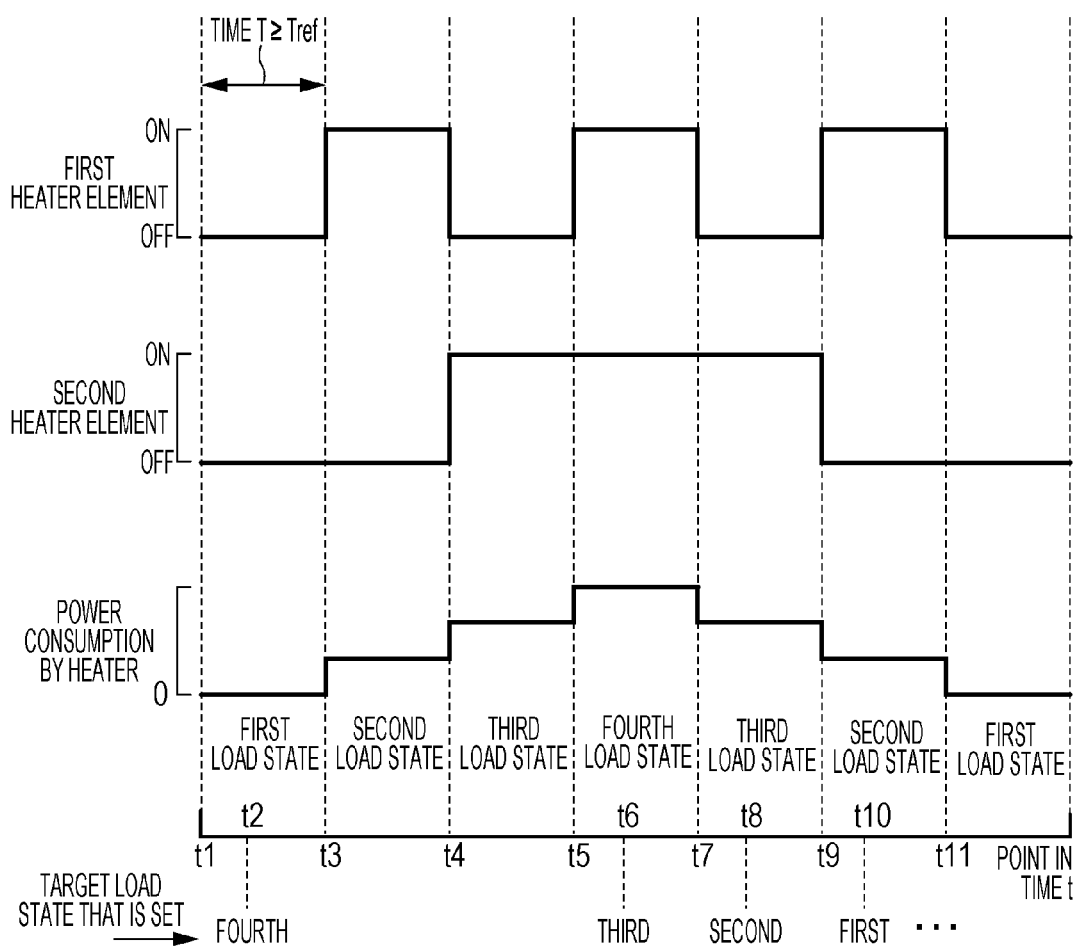
FIG. 5 is a view illustrating an aspect of heater control when a power supply voltage a voltage threshold value.
Figure 6:
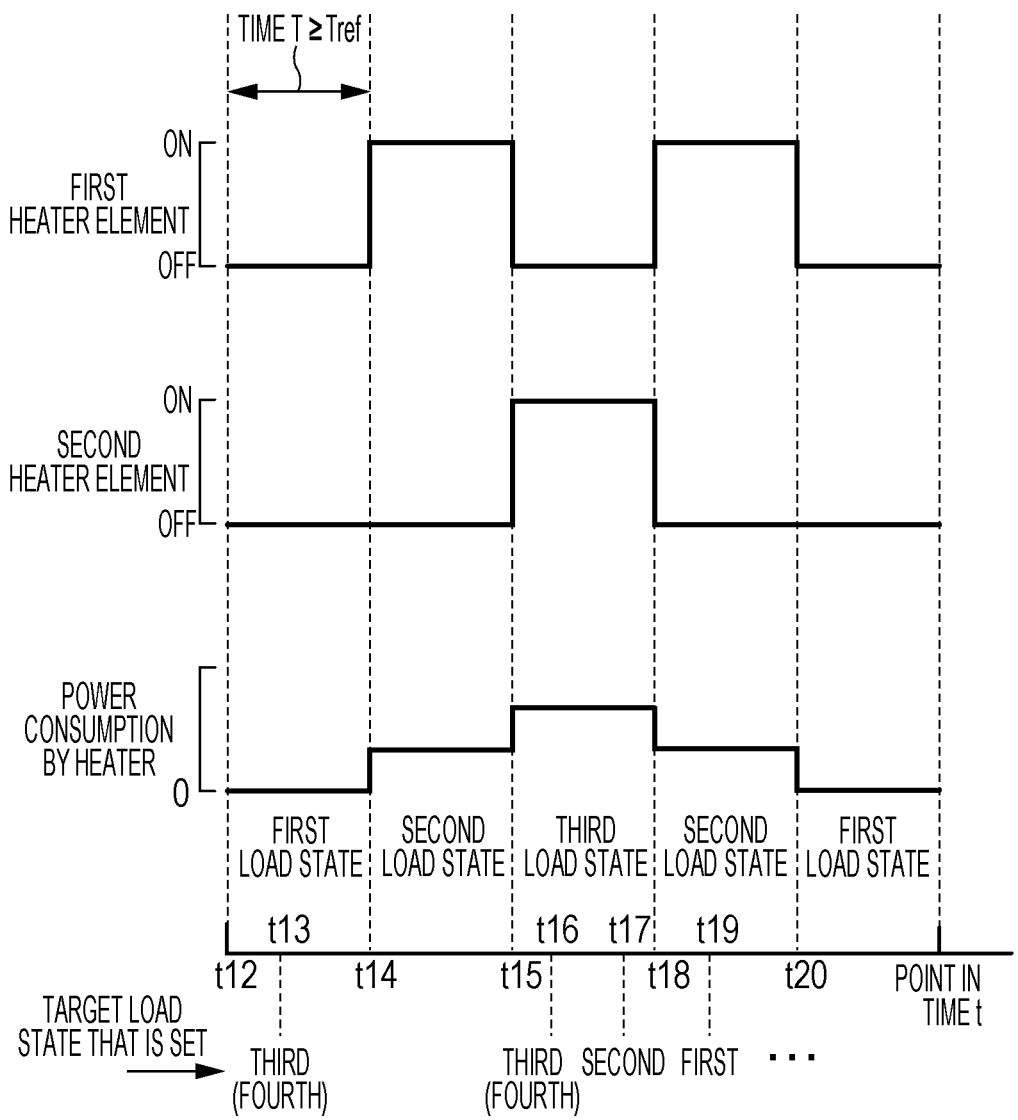
FIG. 6 is a view illustrating the aspect of the heater control when the power supply voltage>the voltage threshold value.

FIG. 5 is a view illustrating a state where the heater switch control routine is executed when the power supply voltage V≤the Voltage threshold value Vref, for example, when the power supply voltage V is AC 100 V. FIG. 6 is a view illustrating a state where the heater switch control routine is executed when the power supply voltage V>the voltage threshold value Vref, for example, when the power supply voltage V is AC 200 V. First, a description is provided referring to FIG. 5. Additionally, in FIG. 5, since the power supply voltage V≤the Voltage threshold value Vref, Step S110 is always performed in the heater switch control routine, and thus the first to fourth load states are set as the switch domain. As illustrated, the heater switch control routine is defined as starting at a point in time t1. In this case, the heater 45 is initially in the first load state and in a state where an amount of produced heat is not present. Then, when the fourth load state is set as the target load state at a point in time t2 when the temperature D of the print medium S is so low that it is equal to or less than the temperature threshold value Dref3, the switch to the second load state is performed at a point in time t3 when the time Tref elapses from the point in time t1, and thus the zero cross point occurs.

Subsequently, the switches of the load state are sequentially performed until the current load state is matched to the fourth load state that is the target load state. That is, the switch to the third load state is performed at a point in time t4 and the switch to the fourth load state is performed at a point in time t5. Additionally, the time Tref or more elapses between the points in time t3 and t4 and between the points in time t4 and t5 as well as between the points in time t1 and t2. Then, because the current load state is matched to the target load state at the point in time t5, the heater switch control routine is ended and is again executed. Then, when the third load state is set as the target load state at a next point in time t6, the switch to the third load state is performed at a point in time t7 when the time Tref elapses from the point in time t5, and thus the zero cross point occurs. In the similar manner thereafter, when the second load state is set as the target load state at a point in time t8, the switch to the second load state is performed at a point in time t9 when the time Tref elapses from the point in time t7 and thus the zero cross point occurs, and when the first load state is set as the target load state at a point in time t10, the switch to the first load state is performed at a point in time t11 when the time Tref elapses from the point in time t9 and thus the zero cross point occurs.

First, a description is provided referring to FIG. 6. Additionally, in FIG. 6, since the power supply voltage V>the Voltage threshold value Vref, Step S120 is always performed in the heater switch control routine, and thus the first to third load states are set as the switch domain. As illustrated, the heater switch control routine is defined as starting at a point in time t12. In this case, the heater 45 is initially in the first load state and in the state where the amount of produced heat is not present. Then, when the temperature D of the print medium S is so low that it is equal to or less than the temperature threshold value Dref3, the load state that corresponds to the temperature D at that time in the load state switch table 86 is the fourth load state, but because the fourth load state is out of the switch domain the third load state is set as the target load state at a point in time t13. Then, the switch to the second load state is performed at a point in time t14 when the time Tref elapses from the point in time t12 and thus the zero cross point occurs. Then, because the current load state is matched to the target load state, the switch to the third load state is performed at a point in time t15 when the time Tref elapses from the point in time t14 and thus the zero cross point occurs. Then, because the current load state is matched to the target load state at the point in time t15, the heater switch control routine is ended and is again executed. Then, when the temperature D of the print medium S is so low at a next point in time t16 that it is equal to or less than the temperature threshold value Dref3, the third load state, not the fourth load state, as at the point in time t13, is set as the target load state. Then, because the current load state is matched to the target load state, as it is, the heater switch control routine is ended. Then, when the temperature D at the point of time t17 is equal to or less than the temperature threshold value Dref1 and exceeds the temperature threshold value Dref2, the second load state is set as the target load state, and the switch to the second load state is performed at a point in time t18 when the time Tref elapses from the point in time t15 and thus the zero cross point occurs. Then, when the first load state is set as the target load state at a next point in time t19, the switch to the first load state is performed at a point in time t20 when the time Tref elapses from the point in time t18 and thus the zero cross point occurs.

At this point, when the switch domain is not limited at the point in time t16 in FIG. 6, the fourth load state is set as the target load state based on the load state switch table 86 and the temperature D, and the switch to the fourth load state is performed at the point in time t18, thereby causing a large electric current to flow. For example, when there are two voltages, AC 100 V and AC 200 V, in the same fourth load state, electric current flows two times more at AC 200 V than at AC 100 V. According to the present embodiment, when the power supply voltage V>the voltage threshold value Vref, the flowing of the large electric current is suppressed with the limitation to the switch to the fourth load state.

At this point, a correspondence relationship is made clear between constituent elements according to the present embodiment and constituent elements according to the aspect of the invention. The heater control unit 61, the voltage detection unit 62, and the switch control unit 80 according to the present embodiment are equivalent to a load control device, a detection unit, and a switch control unit according to the aspect of the invention, respectively. Furthermore, the heater 45 is equivalent to a load, and the first heater element 46 and the second heater element 47 are equivalent to a load element. Additionally, according to the present embodiment, the description of the operation of the switch control unit 80 of the printer 20 also makes clear one example of a method of controlling a load according to the aspect of the invention.

In the printer 20, described above, according to the present embodiment, the switch control unit 80 detects the power supply voltage V of the heater 45, detected by the voltage detection unit 62, and when the detected power supply voltage V falls into the predetermined first domain, the switch is performed on the load state of the heater 45 that ranges from the first load state to the fourth load state. On the other hand, when the detected power supply voltage V falls into the predetermined second domain that is higher in voltage than the first domain, the switch is performed on the load state that ranges from the first load state to the third load state. That is, when the power supply voltage is in the second domain that is higher in voltage than the first domain, a limitation is imposed on the switch to the fourth load state where the combined resistance value R is the lowest among the first and fourth load states. Accordingly, in a case where the power supply voltage V is comparatively high, a maximum value of electric current flowing through the heater 45 is suppressed by suppressing a decrease in the combined resistance value R that is obtainable by the heater 45. That is, the load may be controlled more appropriately using a relationship with the power supply voltage.

Furthermore, since the load state is switched by one stage, a fluctuation in the resistance value of the load, that is, a fluctuation in electric current may be suppressed, compared to a case where the load state is switched by two stages. When this is done, for example, the fluctuation in the combined resistance value R of the heater 45, that is, the fluctuation in electric current may be suppressed, compared to a case where the load state is switched by two stages, such as a case where the first state is switched directly to the third state. The greater a change rate of electric current, the greater the change rate of the power supply voltage V, and although a problem occurs such as an occurrence of a flicker in other devices in some cases, the occurrence of such a problem may be suppressed by switching the load state by one stage. That is, the performance of different types of control in the first domain and in the second domain may suppress not only the maximum value (=a maximum value of a voltage drop in the power supply voltage V) of electric current flowing through the load, but also minimize the change rate of the electric current (=the change rate of the power supply voltage V).

Moreover, since a next switch is not performed until the predetermined time Tref elapses after switching the load state, which is a predetermined condition for approving the switch, the frequent switches of the load state may be more suppressed and the fluctuation in electric current flowing through the load, that is, the fluctuation in the power supply voltage may be more suppressed. The heater 45 supports two types of voltages as rated voltages of commercial power source, the first voltage V1 and the second voltage V2, and the large electric current flows at the time of operating the load with a commercial power source, higher in rated voltage, because the first domain is a domain that includes the first voltage V1 and the second domain is a domain that includes the second voltage V2. Furthermore, this flow of the large electric current may be more suppressed. That is, the load may be controlled more appropriately depending on whether the rated voltage of the commercial power supply is high or low. Also, since the switch is performed on the load state by turning on and off the first heater element 46 and the second heater element 47, the load state may be switched with comparative ease.

Additionally, the invention is never limited to the embodiment described above, and it goes without saying that the invention may be reduced to practice as various embodiments as long as they belong to a technological scope of the invention.

For example, according to the embodiment described above, the heater 45 may be switched to either of the first and fourth load states, but is not limited thereto, and may be switched to three or more load states. Furthermore, when the power supply voltage V falls into the second domain, the first to third load states are set as the switch domain, but is not limited thereto and the first to second load states may be set as the switch domain. In a case where the heater 45 is able to be switched to a n-stage load state, if the switch domain that is present when the power voltage V falls into the second domain is defined as a domain from the first load state to the (n−k)-th load state ($1 \leq k < n$ and k is an integer), the switch domain may be set in whatever manner.

According to the embodiment described above, in the heater 45, the switch of the load state is possible by turning on and turning off the first heater element 46 and the second heater element 47, but the switch of the load state may be possible by performing at least one of the switch between turning on and turn off each load element and the switch between an in-series connection state and an in-parallel connection state, with respect to the multiple load elements. For example, the heater 45 may be constructed from three or more of the heater elements including the heater element that is switchable between turning on and turning off and the heater element that is switchable between the in-series connection state and the in-parallel connection state. Furthermore, the heater 45 may be switchable to three or more of the load states, and is not limited to being constructed from the multiple load elements. For example, the heater may include only one load element as a variable resistor in which the resistance value is switchable to three or more of the load states by one stage.

According to the embodiment described above, the heater 45 supports two types of voltages as the rated voltages of the commercial power supply, the first voltage V1 and the second voltage V2, and the first domain is a domain that includes the first voltage V1 and the second domain is a domain that includes the second voltage V2. However, the invention is not limited to this configuration as long as the limitation is imposed on the switch to the load state where the resistance value is lower when the power supply voltage V falls into the second domain than when the power supply voltage V falls into the first domain. For example, the first domain and the second domain may be domains that are determined in advance in such a manner that the power supply voltage falls into either of the first domain and the second domain depending on the voltage fluctuation in the power supply voltage of the load. More specifically, in a case where, when the rated voltage of the power supply voltage V of the AC power supply 10 is AC 100 V, it is the likelihood that the power supply voltage fluctuates to an extent of 105 V, the domain of voltages that are 102 V or less may be defined as the first domain, and the domain of voltages that exceeds 102 V may be defined as the second domain. When this is done, when the voltage fluctuation causes the power supply voltage V to exceed AC 102 V, the limitation is imposed on the switch to the load state where the resistance value is lower than when the power supply voltage V is AC 102 V or less. Accordingly, the flowing of the large electric current may be suppressed when the voltage fluctuation causes the power supply voltage to be a high voltage. That is, the load may be controlled more appropriately depending on whether the power supply voltage is caused to be high or low.

According to the embodiment described above, the next switch is not performed until the predetermined time Tref elapses, which is the condition for approving the predetermined switch, but different conditions for approving the switch may be employed. For example, the next switch may not be performed during a period of time from when the preceding switch is performed to when the temperature D of the print medium S changes only by a predetermined temperature. When this is done, the frequent switches of the load state may be more suppressed as well. Furthermore, the time Tref may be determined in advance in such a manner that the flicker may be more suppressed. For example, the time Tref may be determined in such a manner that the load state is switched in cycles that are as different as possible from a frequency of 10 Hz at which a human being's eyes easily senses a flicker. Additionally, regardless of whether or not the condition for approving the switch is met, the switch of the load state may be permitted.

According to the embodiment described above, the load state is switched by one stage, but the invention is not limited thereto. For example, the switch of the load state by up to two stages may be permitted, and regardless of by how many of the stages the current load state is switched, the direct switch to target load state may be performed.

According to the embodiment described above, the voltage detection unit 62 detects the power supply voltage V, and the switch control unit 80 determines whether or not the power supply voltage V falls into the first domain or the second domain, using this power supply voltage V as it is, but the invention is not limited thereto, as long as a value relating to the power supply voltage of the load is detected and the power supply voltage V is derived based on the detected value, thereby being used for the determination. For example, a value by which the power supply voltage V is voltage-transformed is defined as detected and the determination may be performed based on a value after the voltage transformation. Furthermore, an electric current flowing through the heater 45 is detected, and the power supply voltage V may be derived by the product of the electric current and the combined resistance value R based on the detected electric current and the current load state.

According to the embodiment described above, the target load state is set based on the temperature D of the print medium S, but a temperature of the heater 45 itself is detected, and the target load state may be set based on the temperature of the heater 45.

According to the embodiment described above, in the heater switch control routine in FIG. 4, processing Steps S160 to S180 are performed until the current load state is matched to the target load state in Step S150 after the target load state is set in Step S140, but the invention is not limited thereto. For example, the heater switch control routine may be ended without proceeding to Step S150 after Step S180, and a next heater switch control routine may be started. When this is done, even in a case where the current load state is not matched to the target load state in Step S150, the target load state may be set in Step S140 each time the load state is switched by one stage. For this reason, in a case where the temperature D is changed, it becomes easy to set the target load state that depends on the post-change temperature D.

According to the embodiment described above, in Step S140 of the heater switch control routine in FIG. 4, the target load state is set in the switch domain that is set, but the invention is not limited thereto. For example, the setting of the target load state is performed without any limitation to the switch domain, and the switch may be performed on the load state within the switch domain.

According to the embodiment described, in the heater switch control routine in FIG. 4, regardless of whether or not the power supply voltage V is equal to or less than the voltage threshold value Vref in Step S100, the target load state is set using the same load state switch table 86 in Step S140, but the invention is not limited thereto. For example, the target load state may be set using the different load state switch table, depending on whether or not the power supply voltage V is equal to or less than the voltage threshold value Vref, that is, whether the power supply voltage V falls into either of the first domain and the second domain. In this case, when the power supply voltage V falls into the second domain that is higher in voltage than the first domain, the table may be used in which the smaller combined resistance value R tends to be matched to the same temperature, compared to when the power supply voltage V falls into the first domain.

Figure 7:
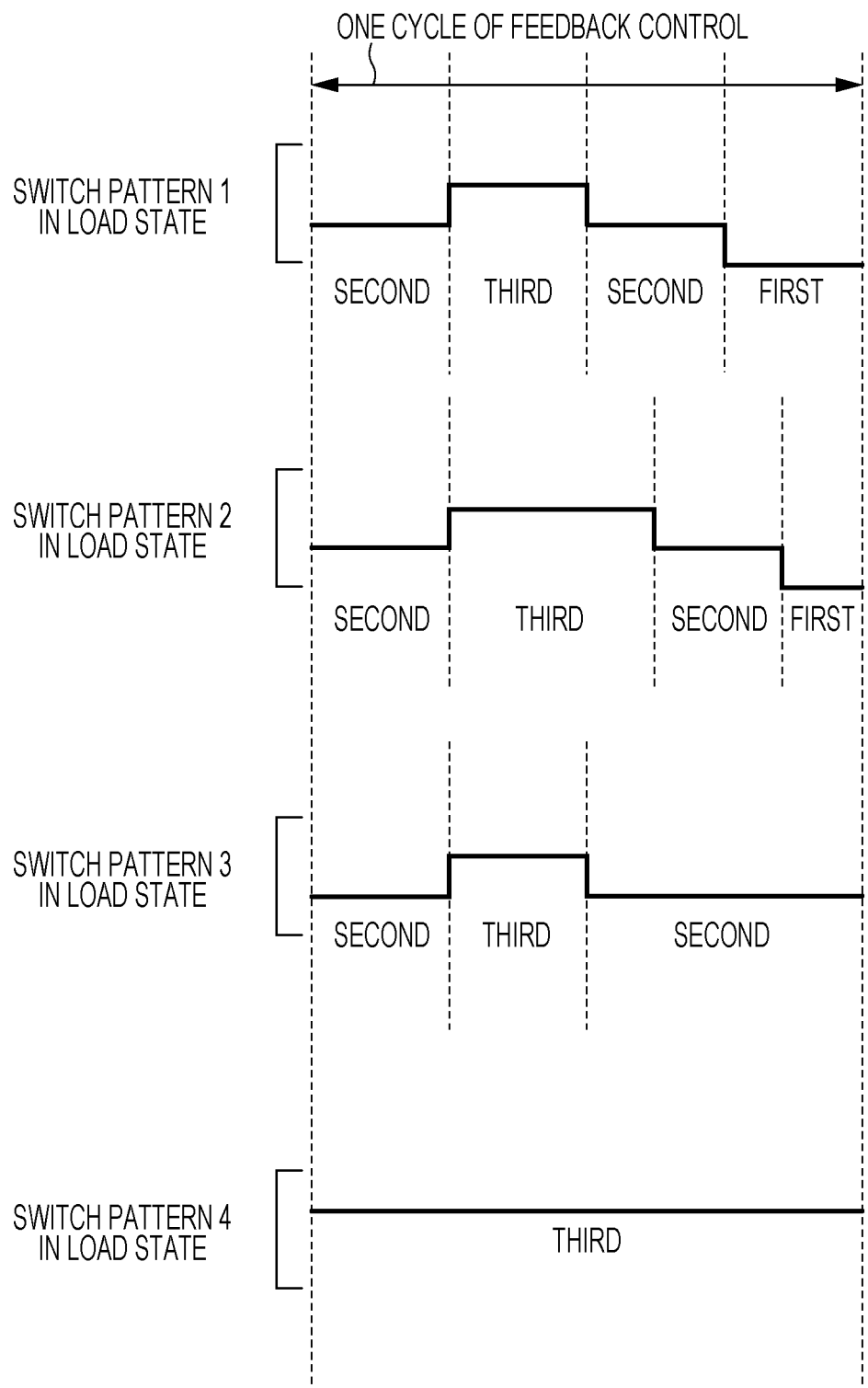
FIG. 7 is a view illustrating an example of a switch pattern in a case where the power supply voltage falls into a second domain.
Figure 8:
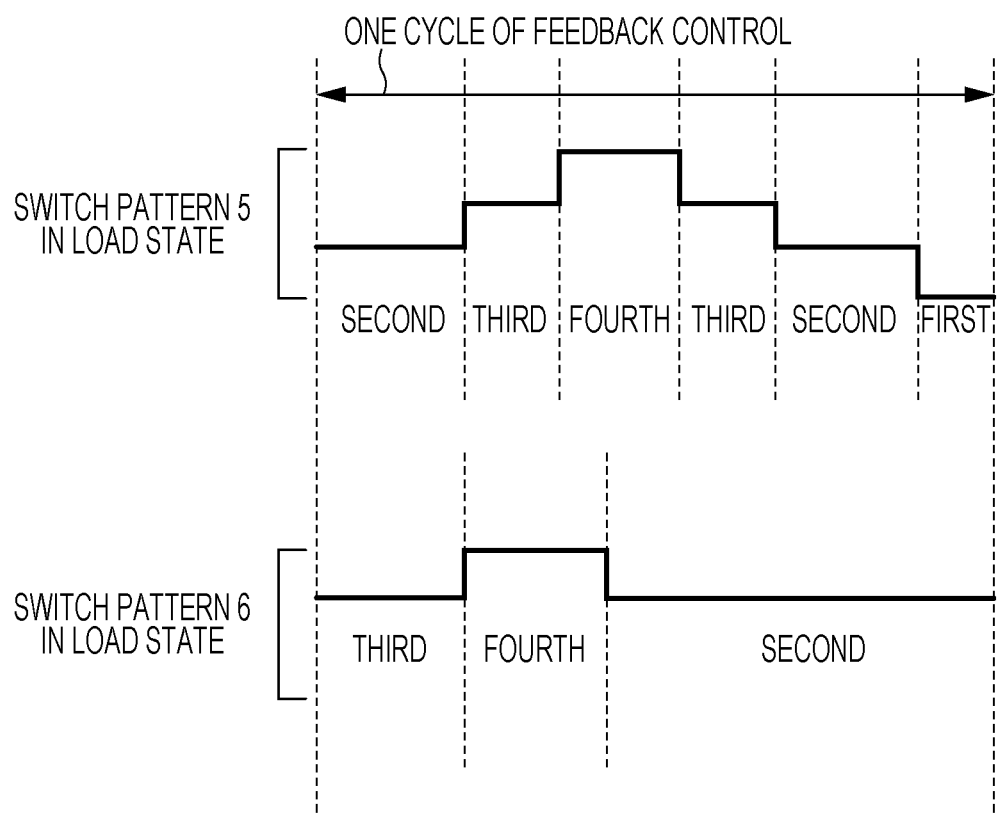
FIG. 8 is a view illustrating an example of the switch pattern in a case where the power supply voltage falls into a first domain.

According to the embodiment described above, the switch is performed on the load state toward the target load state that is determined based on the temperature D, but the invention is not limited thereto and the switch may be performed on the load state in whatever manner. For example, either of multiple switch patterns including the switch pattern, made from a combination of at least two or more of the load states among the multiple load states, in which a switch order is determined in such a manner that the load state is switched by one stage, is selected and the switch may be performed on the load state according to the selected switch pattern. FIG. 7 is a view illustrating an example of the switch pattern in a case where the power supply voltage V falls into the second domain. FIG. 8 is a view illustrating an example of the switch pattern in a case where the power supply voltage V falls into the first domain. As illustrated in FIG. 7, in a case where the power supply voltage V falls into the second domain, the switch patterns 1 and 4 are prepared which determine in advance at what timing and in what order the load state of the first to third load states is switched and either of these switch patterns is selected and the switch may be performed on the load state according to the selected switch pattern. Similarly, in a case where the power supply voltage V falls into the first domain, the switch patterns 5 and 6, as illustrated in FIG. 8, are prepared which determine in advance at what timing and in what order the load state of the first to fourth load states is switched, and either of these switch patterns is selected and the switch may be performed on the load state according to the selected switch pattern. Furthermore, feedback control may be performed which selects either of the multiple switch patterns every predetermined period and performs the switch on the load state according to the selected switch pattern in such a manner that the temperature of the load or a temperature of an object heated by the load approaches a target value. For example, in a case where the power supply voltage V falls into the second domain, the switch pattern may be selected based on a relationship between the temperature D and the target temperature, such as selecting the switch pattern 2 to cause a greater amount of produced heat when the temperature D falls short of the target temperature, and selecting the switch pattern 1 to cause a smaller amount of produced heat than the pattern 2 when the temperature D approaches the target temperature. Furthermore, in a case where the feedback control is performed, a time length of one switch pattern may be the same as a length of one cycle (a predetermined cycle) of the feedback control as illustrated in FIGS. 7 and 8. Additionally, in the switch patterns 1 to 6 illustrated in FIGS. 7 and 8, the switch order is determined in which the load state is switched by one stage in either of the switch patterns, but the invention is not limited thereto and each of the switch patterns 1 to 6 may be a pattern that permits the switch of the load state by two or more stages. Furthermore, all of the switch patterns selected may be defined, for example, as a pattern in which either of the initial load state and the last load state in the switch patterns becomes either of the first load state and the second load state, as in the switch patterns 1 to 3 in FIG. 7 and in the switch pattern 5 in FIG. 8. When this is done, because when the last load state in the last time switch pattern is switched to the initial load state in the next switch pattern, the switch of the state by two or more stages is not able to occur, a change in resistance value of the load, that is, a change in electric current may be more suppressed.

In the embodiment described above, the heater 45 operates on electricity from the AC power supply 10, but the invention is not limited thereto and the heater 45 may operate on electricity from a DC power supply.

According to the embodiment described above, the switch control unit 80 that is configured as a microcomputer separately from the controller 50 executes the heater switch control routine to control the heater 45, but the invention is not limited thereto. For example, the controller 50 has a function of the switch control unit 80 described above, and the controller 50 may execute the heater switch control routine to control the heater 45.

According to the embodiment, in the printer 20, the heater control unit 61 switches on and off the first heater element 46 and the second heater element 47 of the heater 45 that dries up the ink discharged onto the print medium S by heating the print medium S, but may control any heater, such as a heater used for another purpose of the printer 20 and a heater used in an apparatus other than the printer 20.

In the embodiment described above, the heater control unit 61 performs the switches of the first heater element 46 and the second heater element 47 as the heater element, but the invention is not limited to the heater element and the switch of whatever load may be performed. For example, the switch of the load such as a fan may be performed.

The entire disclosure of Japanese Patent Application No. 2012-54793, filed Mar. 12, 2012 is expressly incorporated by reference herein.

What is claimed is:

1. A load control device that controls a load which is switchable to any one of n stage load states including a first load state, a second load state and so forth to an n-th load state of which resistance values are R1, R2, and so forth to Rn (n is an integer that is equal to or greater than 3 and R1>R2> . . . >Rn), respectively, comprising:
   a detection unit that detects a value relating to a power supply voltage of the load; and
   a switch control unit that performs a switch on the load state in a range from the first load state to the n-th load state when the power supply voltage derived based on the detected value falls into a predetermined first domain, and that performs the switch on the load state in a range from the first load state to the (n−k)-th load state ($1 \leq k < n$ and k is an integer) when the power supply voltage derived based on the detected value falls into a predetermined second domain that is higher in voltage than the first domain.

2. The load control device according to claim 1, wherein the switch control unit is a unit that switches the load state by one stage.

3. The load control device according to claim 1, wherein the switch control unit is a unit that does not perform a next switch until a predetermined condition for approving the switch is met after the load state is switched.

4. The load control device according to claim 1, wherein the load supports a predetermined first voltage V1 and a predetermined second voltage V2 (>V1) as a rated voltage of a commercial power supply, and wherein the first domain is a domain that includes the first voltage V1 and the second domain is a domain that includes the second voltage V2.

5. The load control device according to claim 1, Wherein the first domain and the second domain are domains that are predetermined in such a manner that the power supply voltage falls into either of the first domain, or the second domain due to voltage fluctuation in a power supply voltage of the load.

6. The load control device according to claim 1, wherein the switch control unit is a unit that selects one of a plurality of switch patterns made from a combination of at least two or more of the load states among a plurality of the load states, in which a switch order is determined in such a manner that the load state is switched by one stage, and performs the switch on the load state according to the selected switch pattern.

7. The load control device according to claim 6, wherein the load is a heater, and wherein the switch control unit is a unit that performs feedback control which selects either of the multiple switch patterns every predetermined period and performs the switch on the load state according to the selected switch pattern in such a manner that a temperature of the load or a temperature of an object heated by the load approaches a target value.

8. The load control device according to claim 1, wherein the load is constructed from a plurality of load elements, wherein the switch of the load state is made possible by performing at least either of the switch that turns on and off each load element and the switch between an in-series connection state and an in-parallel connection state with respect to the plurality of load elements, and wherein the resistance value of the load is a combined resistance value of the plurality of load elements.

9. An image forming apparatus comprising: a load control device according to claim 1; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

10. An image forming apparatus comprising: a load control device according to claim 2; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

11. An image forming apparatus comprising: a load control device according to claim 3; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

12. An image forming apparatus comprising: a load control device according to claim 4; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

13. An image forming apparatus comprising: a load control device according to claim 5; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

14. An image forming apparatus comprising: a load control device according to claim 6; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

15. An image forming apparatus comprising: a load control device according to claim 7; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

16. An image forming apparatus comprising: a load control device according to claim 8; a head through which liquid is discharged to form an image on a medium; and a load that is a heater which dries up the liquid discharged onto the medium by heating the medium and that the switch control unit is able to switch to any one of n stage load states including a first load state, a second load state and so forth to an n-th load state of which resistance values are R1, R2, and so forth to Rn (n is an integer that is equal to or greater than 3 and R1>R2>...>Rn).

17. A load control device that controls a load which is switchable to any one of n stage load states including a first load state, a second load state and so forth to an n-th load state of which resistance values are R1, R2, and so forth to Rn (n is an integer that is equal to or greater than 3 and R1>R2>...>Rn), respectively, comprising:
   a detection unit that detects a value relating to a power supply voltage of the load; and
   a switch control unit that selects a switch pattern from among a plurality of switch patterns and performs the switch on the load state according to the selected switch pattern, each switch pattern comprising a combination of at least two or more of the load states arranged in an order such that the load state never changes by more than one stage,
   wherein the number of load states included in each of the switch patterns depends upon the power supply voltage.

* * * * *